(12) United States Patent
Suontama et al.

(10) Patent No.: US 9,373,039 B2
(45) Date of Patent: *Jun. 21, 2016

(54) DETECTION OF GRAPHICS ADDED TO A VIDEO SIGNAL

(71) Applicant: Supponor OY, Ristiina (FI)

(72) Inventors: Vesa Suontama, Espoo (FI); Arto Vuori, Helsinki (FI)

(73) Assignee: Supponor Oy, Ristiina (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,153

(22) Filed: Oct. 28, 2014

(65) Prior Publication Data

US 2015/0055019 A1   Feb. 26, 2015

Related U.S. Application Data

(63) Continuation-in-part of application No. 14/009,513, filed as application No. PCT/FI2011/050350 on Apr. 18, 2011, now Pat. No. 8,878,999.

(51) Int. Cl.
| | |
|---|---|
| H04N 9/76 | (2006.01) |
| G06K 9/00 | (2006.01) |
| H04N 5/445 | (2011.01) |
| H04N 21/234 | (2011.01) |
| H04N 21/44 | (2011.01) |
| H04N 21/81 | (2011.01) |

(52) U.S. Cl.
CPC ............ *G06K 9/00711* (2013.01); *H04N 5/445* (2013.01); *H04N 5/44508* (2013.01); *H04N 21/23418* (2013.01); *H04N 21/44008* (2013.01); *G06K 9/00456* (2013.01); *G06K 2209/25* (2013.01); *H04N 21/8153* (2013.01)

(58) Field of Classification Search
CPC ............. H04N 17/00; H04N 21/8153; H04N 21/23418; H04N 9/45; H04N 21/44008; H04N 5/45; G06K 9/00711
USPC ......................................................... 348/600
See application file for complete search history.

(56) References Cited

U.S. PATENT DOCUMENTS

| | | | | |
|---|---|---|---|---|
| 6,906,743 | B1 * | 6/2005 | Maurer ................ | H04N 7/0112 348/180 |
| 7,339,992 | B2 * | 3/2008 | Chang ............... | G06F 17/30796 375/240.25 |
| 2005/0273694 | A1 * | 12/2005 | Chouraqui ............. | H04N 7/163 715/202 |
| 2007/0064014 | A1 * | 3/2007 | Piek ....................... | G06T 7/2053 345/629 |
| 2008/0143880 | A1 * | 6/2008 | Jung .................... | G06K 9/3266 348/571 |
| 2009/0016618 | A1 | 1/2009 | Zhou | |
| 2010/0128802 | A1 | 5/2010 | Shih et al. | |
| 2010/0220930 | A1 * | 9/2010 | Sun ...................... | G06K 9/3266 382/190 |

* cited by examiner

*Primary Examiner* — Michael Lee
(74) *Attorney, Agent, or Firm* — Coats & Bennett, P.L.L.C.

(57) ABSTRACT

The invention allows detecting which graphics, if any, have been added to the video signal at any given time by utilizing only the various signals provided by prior art hardware. A first video signal, graphics signal(s), and a second video signal are received. It is then determined which graphics, if any, are present in a given frame of the received second video signal based on comparing actual values of pixels of the received second video signal and calculated values of pixels derived from the first video signal, and the graphics signal(s), and the combination of graphics signal(s) which produces the best match is searched for.

20 Claims, 4 Drawing Sheets

DETECTION OF GRAPHICS ADDED TO A VIDEO SIGNAL

CROSS-REFERENCE TO RELATED APPLICATIONS

This application is a continuation-in-part of U.S. application Ser. No. 14/009,513, which is the National Stage of International Application No. PCT/FI2011/050350, filed Apr. 18, 2011, the disclosures of each of which are hereby incorporated by reference herein in their entirety.

BACKGROUND OF THE INVENTION

1. Field of the Invention

The invention relates to video signal processing. In particular, the invention relates to methods, computer programs and apparatuses for detecting the presence of additional graphics in a video signal.

2. Description of the Related Art

Today, it is common for television broadcasts to add information in the form of graphics to the video signal(s) being shot by the television camera(s). For example, television broadcasts of sports events are typically produced so that additional information in the form of graphics is provided to the viewer to help him/her to understand the game. This additional information is added on top of the video images, and the additional information may be e.g. a game clock, a logo of the broadcasting television station (typically added to the upper right corner), a player's name, etc.

In a broadcast environment, the additional graphics are typically formed by a graphics system and mixed by a vision mixer. A vision mixer (also called video switcher, video mixer or production switcher) is a device that mixes different video sources to output feeds. Typically a vision mixer can be found in a professional television production environment such as a television studio, a cable broadcast facility, a commercial production facility, a remote truck/outside broadcast van (OB van), or a linear video editing bay. E.g. a vision engineer located in an outside broadcast van is listening to instructions from a director of a sports broadcast and selecting the camera to be shown. The director also instructs the vision engineer to turn certain graphics on or off in order to produce an aesthetic experience for the viewer and/or to make the program more informative to the viewer. For example, the game clock is typically hidden during replay after a goal, and the name of a player is displayed together with the image of the player.

The vision mixer gets different inputs, such as camera inputs, recorder inputs, and feeds from a graphics system. These inputs to the vision mixer are typically independent of the director's instructions. For example, on one of the inputs, the clock is on all the time.

Typically, graphics to be added on top of the video images is partly transparent, and the graphics is arranged on top of the video images by means of two auxiliary signals: a graphics signal and a mask signal. The graphics signal includes the graphics to be added (such as a logo of a broadcasting station, the name of a player in a sports broadcast, or a game dock), and the mask signal (also known as a key signal) defines the transparency (also known as alpha) of pixels of its associated graphics signal. A mask signal is typically a monochrome signal, where completely black areas correspond to completely transparent, and completely white areas correspond to opaque. Areas between completely black and completely white correspond to various degrees (e.g. in percentages) of transparency.

Typically but not always, each graphics signal/mask signal-pair corresponds to a single graphics layer, and there may be several of these graphics signal/mask signal-pairs per one video signal. At any given time, one or more of these graphics signal/mask signal-pairs may be mixed on or off the video signal (e.g. by the vision engineer using the vision mixer), so that the corresponding graphics will or will not be visible as required. In the art, the video signal without the added graphics is often called a clean feed, and the video signal with the added graphics is called a dirty feed.

Typically, a prior art vision mixer outputs only the clean feed and the dirty feed, and at least the dirty feed is then forwarded in the broadcast signal transmission chain until it finally reaches the viewers. That is, prior art vision mixers are not configured to output any specific information about which combination of the input graphics signals is on (i.e. mixed into the clean feed to create the dirty feed) at any given time. The presence of transparency (i.e. the mask signals) means that one cannot just compare the clean feed and the dirty feed pixel-by-pixel to try to determine the added graphics based on the differences, since it is not trivial to determine the color and the transparency of a pixel in such a case.

Yet, there are situations in which it would be useful to be able to detect which graphics are added to a video signal, such as a television broadcast signal at any given time. For example, the present applicant's earlier patent application WO 2009/074710 describes a method for modifying the content of a television image by inserting substitutive content into specific areas of a television image. Information about which graphics are added to the television image at any given time facilitates such insertion of the substitutive content.

As described above, to obtain this information about which graphics are added to the video signal at any given time, in prior art one has had to e.g. modify conventional vision mixers so that they can provide this information. However, this is a major disadvantage since it requires the owner of the vision mixer to do this, and modifications to expensive existing systems are risky.

Therefore, an object of the present invention is to alleviate the problems described above and to introduce a solution that allows detecting which graphics are added to the video signal at any given time by utilizing only the various signals provided by e.g. a vision mixer and/or a graphics system, i.e. without requiring any modifications to existing conventional hardware.

A further object of the present information is to provide additional information about the one or more graphics signal which have been periodically added into the video signal, again without requiring any modifications to the existing conventional hardware.

SUMMARY OF THE INVENTION

The described method and apparatus allows detecting which graphics, if any, have been added to a video signal at any given time by utilizing only the various signals provided by prior art hardware. A first video signal, graphics signal(s), and a second video signal are received. It is then determined which graphics, if any, are present in a given frame of the received second video signal based on comparing actual values of pixels of the received second video signal and calculated values of pixels derived from the first video signal, and the graphics signal(s), and the combination of graphics signal(s) which produces the best match is searched for.

In one aspect there is described a method of detecting the presence of additional graphics in a video signal. The following are received: a first video signal, at least one graphics signal, and a second video signal comprising said first video signal mixed at least periodically with the at least one graphics signal. Calculated values of pixels are derived from a frame of the received first video signal and a corresponding frame of the received at least one graphics signal. The calculated values are compared with actual values of pixels of a corresponding frame of the received second video signal. A presence status of the at least one graphics signal in the frame of the received second video signal is determined based on the performed comparison.

In another aspect there is described an apparatus for detecting the presence of additional graphics in a video signal. The apparatus comprises a receiver configured to receive a first video signal, at least one graphics signal, and a second video signal comprising said first video signal mixed at least periodically with the at least one graphics signal. The apparatus further comprises a calculator configured to derive calculated values of pixels from a frame of the received first video signal and a corresponding frame of the received at least one graphics signal. The apparatus further comprises a comparator configured to compare the calculated values with actual values of pixels of a corresponding frame of the received second video signal. The apparatus further comprises a selector configured to determine a presence status of the at least one graphics signal in the frame of the received second video signal based on the performed comparison.

In another aspect there is described a computer program comprising code adapted to cause the following when executed on a data-processing system: receiving a first video signal, at least one graphics signal, and a second video signal comprising said first video signal mixed at least periodically with the at least one graphics signal; deriving calculated values of pixels from a frame of the received first video signal and a corresponding frame of the received at least one graphics signal; comparing the calculated values with actual values of pixels of a corresponding frame of the received second video signal; and determining a presence status of the at least one graphics signal in the frame of the received second video signal based on the performed comparison.

A fourth aspect of the present invention is an apparatus for detecting the presence of additional graphics in a video signal. The apparatus comprises a receiving means for receiving a first video signal, at least one graphics signal, and a second video signal comprising said first video signal mixed at least periodically with the at least one graphics signal. The apparatus further comprises a calculating means for deriving calculated values of pixels from a frame of the received first video signal and a corresponding frame of the received at least one graphics signal. The apparatus further comprises a comparing means for comparing the calculated values with actual values of pixels of a corresponding frame of the received second video signal. The apparatus further comprises a selecting means for determining a presence status of the at least one graphics signal in the frame of the received second video signal based on the performed comparison.

In one example, the receiving further comprises receiving transparency information indicating transparency of at least a portion of a frame of an associated graphics signal, and the deriving further comprises deriving the calculated values of pixels from the received transparency information in addition to the frame of the received first video signal and the corresponding frame of the received at least one graphics signal.

In one example, the deriving further comprises deriving the calculated values for a number of presence combinations of the at least one graphics signal.

In one example, the determination of the presence status is performed by selecting—as indicative of the presence status of the at least one graphics signal in the frame of the received second video signal—the presence combination the calculated values of which best match with the compared actual values according to a statistical criterion.

In one example, an effective result of used graphics information and/or associated resulting transparency information is produced, based on the determined presence status.

In one example, the produced used graphics information and its associated used transparency information are applied to one or more additional incoming video signals to produce one or more additional output video signals.

In one example, the computer program of the third aspect of the present invention is stored on a computer-readable medium. In an embodiment of the invention, the computer-readable medium only includes a non-transitory medium.

It is to be understood that the aspects and embodiments of the invention described above may be used in any combination with each other. Several of the aspects and embodiments may be combined together to form a further embodiment of the invention. A method, an apparatus, or a computer program which is an aspect of the invention may comprise at least one of the embodiments of the invention described above.

In one example the described method and apparatus allows detecting which graphics are added to the video signal at any given time by utilizing only the various signals readily provided by e.g. a vision mixer and/or a graphics system, i.e. without requiring any modifications to existing conventional hardware. This way, the detection of the graphics can be performed in a significantly more cost-effective and less time- and effort-consuming manner. Furthermore, the invention allows detecting the presence of the added graphics even when there are rounding errors or noise present.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

In the following, the invention is described with examples related to television broadcasting. However, it is to be understood that the present Invention is not limited to such implementations. Instead, the present invention can as well be used in any applications in which a first video signal, graphics signal(s), and a second video signal are available. The first video signal may be e.g. a clean video signal or a clean feed, and the second video signal may be e.g. a dirty video signal or a dirty feed. The first and/or second video signal may be a live signal being shot with e.g. a television camera, or the first and/or second video signal may be e.g. a previously recorded video signal stored e.g. in a file or several files.

Furthermore, herein the term "signal" is used as a logical concept. I.e. each signal is not necessarily transferred in a separate physical channel. Rather, several signals may be transferred in a common physical channel shared by the signals.

Figure 1:
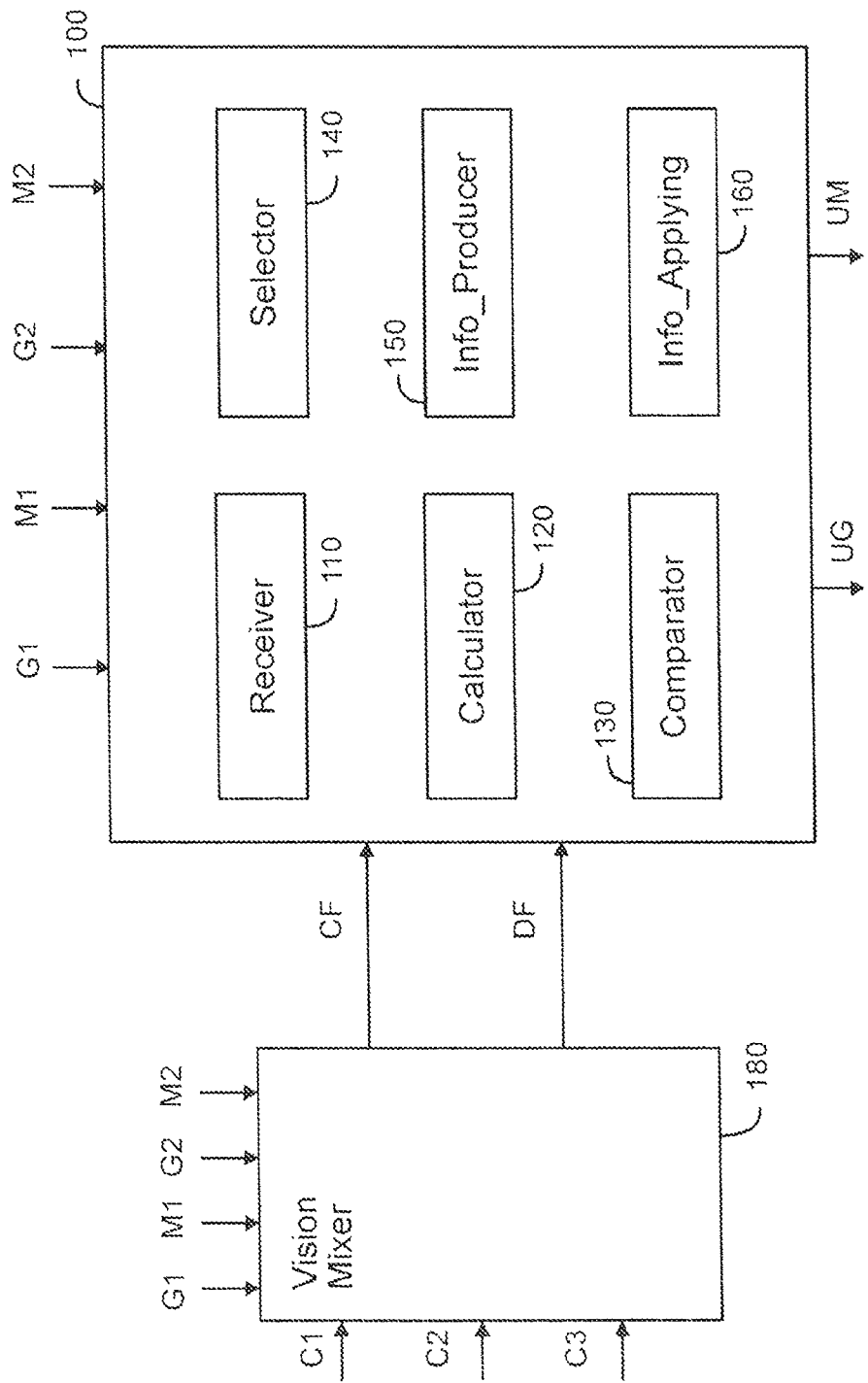
FIG. 1 is a block diagram illustrating an apparatus according to an embodiment of the invention as deployed in connection with a prior art vision mixer.

FIG. 1 is a block diagram illustrating an apparatus 100 according to an embodiment of the invention as deployed in connection with a prior art vision mixer 180.

The vision mixer 180 is a device that mixes different video sources to output feeds. Typically a vision mixer can be found in a professional television production environment such as a television studio, a cable broadcast facility, a commercial production facility, a remote truck/outside broadcast van, or a linear video editing bay.

As depicted in FIG. 1, inputs of the vision mixer 180 include a first graphics signal G1 and a second graphics signal G2. The first graphics signal G1 may comprise first graphics or graphical element(s) (e.g. a television station logo), and the second graphics signal G2 may comprise second graphics or graphical element(s) (e.g. a game clock). The inputs of the vision mixer 180 may further include a first mask signal M1 and a second mask signal M2. The first mask signal M1 may comprise transparency information that indicates transparency of at least a portion of a frame of its associated graphics signal G1, such as e.g. pixel-specific transparency values (also known as alpha values) for the first graphics signal G1, and the second mask signal M2 may comprise transparency information that indicates transparency of at least a portion of a frame of its associated graphics signal G2, such as e.g. pixel-specific transparency values for the second graphics signal G2. The transparency values may vary e.g. from 0 to 1, with 0 corresponding to e.g. totally transparent, 1 corresponding to e.g. totally opaque, and values between 0 and 1 corresponding to e.g. various degrees of transparency. In the art, the term "mask" is also known as "key".

The inputs of the vision mixer 180 may further include a first camera signal C1, a second camera signal C2, and a third camera signal C3, each being fed from e.g. a respective television camera (not illustrated in FIG. 1).

At any given time, one of the camera signals C1, C2, C3 is selected as active (by e.g. a vision engineer operating the vision mixer 180), and one or more of the graphics signals (or graphics or graphical elements in the graphics signals) may be added/mixed (again by e.g. the vision engineer operating the vision mixer 180) into the selected camera signal with the transparency of each added graphics signal/graphics/graphical element being defined by its respective transparency information or transparency values. Accordingly, each graphics/graphical element may be opaque, partially transparent, or wholly transparent. In the following, the camera signal selected as active without any added graphics/graphical element will be referred to as a first or "clean" video signal (also known as clean feed), and the camera signal selected as active with at least periodically added graphics/graphical element(s) will be referred to as a second or "dirty" video signal (also known as dirty feed). The clean video signal CF and the dirty video signal DF are outputs from the vision mixer 180.

It is to be understood that the amount of the various signals depicted in FIG. 1 is provided as an example only, and that any number of signals may be used.

Conventionally, at least the dirty video signal DF and optionally the clean video signal CF would next be forwarded in the broadcast signal transmission chain in order to transmit the dirty video signal DF as a television broadcast signal to the viewers.

However, the present invention introduces the apparatus 100 for detecting which of the graphics/graphical elements are added to the dirty video signal DF at a given time, and the clean video signal CF and the dirty video signal DF are therefore first input into this apparatus 100.

In the non-limiting example of FIG. 1, the inputs of the apparatus 100 further include the first graphics signal G1, the second graphics signal G2, the first mask signal M1 (carrying first transparency information), and the second mask signal M2 (carrying second transparency information). The apparatus 100 may obtain the first graphics signal G1, the second graphics signal G2, the first mask signal M1, and the second mask signal M2 e.g. from a conventional graphics system (not illustrated in FIG. 1) arranged in connection with the vision mixer 180 in a broadcasting environment.

As used herein, the term "graphics system" refers to a prior art graphics machine or entity that generates graphics signals and mask signals and provides them to a vision mixer.

In other words, the apparatus 100 comprises a receiver 110 that is configured to receive a first or clean video signal CF, graphics signals G1 and G2, and a second or dirty video signal DF that comprises the first video signal G1 mixed at least periodically with the graphics signals G1 and/or G2. In an embodiment of the invention, the receiver 110 may be further configured to receive transparency information (comprised e.g. the mask signals M1, M2) indicating transparency of at least a portion of a frame of an associated graphics signal.

As is known in the art, the mixing of a clean video signal and a graphics signal may be expressed with the following Equation 1 (calculated e.g. separately for each pixel and each color component (e.g. in RGB space as used herein as an example, but any other color space such as YUV space can be used instead, since conversion between color spaces is trivial for those skilled in the art)):

$$DF_1 = (1-M_1)*CF + M_1*G \quad \text{(Eq. 1)}$$

In the Equation 1, the $M_1$ represents the transparency value (e.g. from 0 to 1) of the first added graphics signal, $G_1$ represents the intensity of the first added graphics signal, CF represents the intensity of the clean video signal, and $DF_1$ represents the intensity of the dirty video signal after mixing the first added graphics signal into it.

Herein, the intensity of a pixel consists of intensities or intensity measures of the color components of the pixel.

The equation examples below are for a linear RGB color system. As is known to those skilled in the art, equations for other color systems may also be derived.

If there is also a second graphics signal to be added, the following Equation 2 represent the situation after adding the first and the second graphics signals:

$$DF_2 = (1-M_2)*DF_1 + M_2*G_2 \quad \text{(Eq. 2)}$$

In the Equation 2, the $M_2$ represents the transparency value (from 0 to 1) of the second added graphics signal, $G_2$ represents the intensity of the second added graphics signal, $DF_1$ represents the intensity of the dirty video signal after mixing the first added graphics signal into it, and $DF_2$ represents the intensity of the dirty video signal after mixing the second added graphics signal into it.

Combining Equation 1 and Equation 2 produces the following Equation 3:

$$DF_2 = (1-M_2)*((1-M_1)*CF + M_1*G_1) + M_2*G_2 \quad \text{(Eq. 3)}$$

Generalizing this for n inputs produces the following Equation 4:

$$DF_N = (1-M_N)*(DF_{N-1}) + M_N*G_N \quad \text{(Eq. 4)}$$

The problem of the present invention, i.e. finding the added graphics, can be transformed to an equation so that we try to find multipliers or coefficients ($K_N$) for each of the mask values. Each coefficient K can have as its value e.g. either 0 or 1, of which e.g. 0 indicates that the corresponding graphical element is not present, and e.g. 1 indicates that it is present.

For the example of FIG. 1 of two graphics signals and two mask signals, this produces the following Equation 5:

$$DF_2 = (1-K_2*M_2)*((1-K_1*M_1)*CF + K_1*M_1*G_1) + K_2*M_2*G_2 \quad \text{(Eq. 5)}$$

Equation 5 can be obtained from Equation 3 by substituting $M_N$ with $K_N*M_N$.

Obviously, Equation 5 can be extended to a general case, but for the purposes of facilitating the understanding of the invention, the case of two graphics signals and two mask signals will be used herein to illustrate the invention. Similarly, other means of finding which graphics are on the air can be used.

The apparatus 100 further comprises a calculator 120 that is configured to derive calculated values from a frame of the received first video signal CF, from a corresponding frame of the received at least one graphics signal G1, G2, and optionally from the received transparency information M1, M2. Optionally, the calculator 120 may be further configured to derive the calculated values for a number of presence combinations of the at least one graphics signal G1, G2. Herein, the term "presence combinations" refers to the various combinations of the graphics signal(s) being present/on (i.e. mixed-in) or absent/off (i.e. not mixed-in) in a given frame of the second video signal DF. For example, in the case of two graphics signals G1, G2, presence combinations may include following combinations:

0—both G1 and G2 are off (i.e. Dirty Feed DF is the same as Clean Feed CF);

1—first graphics signal G1 is on and second graphics signal G2 is off;

2—first graphics signal G1 is off and second graphics signal G2 is on;

12—both graphics signals G1 and G2 are on, and the second one G2 is drawn after the first one G1; etc.

The apparatus 100 further comprises a comparator 130 that is configured to compare the calculated values with actual values of a corresponding frame of the received second video signal DF.

The apparatus 100 further comprises a selector 140 that is configured to determine a presence status of the at least one graphics signal G1, G2 in the frame of the received second video signal DF based on the performed comparison. Herein, the term "presence status" of a graphics signal refers to whether the graphics signal in question is present in a given frame of the second video signal DF or not. In an embodiment, the selector 140 may be configured to perform the determination of the presence status by selecting the presence combination the calculated values of which best match with the compared actual values according to a statistical criterion, as being indicative of the presence status of the at least one graphics signal in the frame of the received second video signal.

The apparatus 100 may further comprise an information producer 150 that is configured to produce at least one of used graphics information and associated used transparency information, wherein the used graphics information Indicates the determined presence status.

The apparatus 100 may further comprise an information applying unit 160 that is configured to apply the produced used graphics Information and its associated used transparency information to one or more additional incoming video signals to produce one or more additional output video signals.

In other words, the calculator 120, and the comparator 130 may be used to try out all the different combinations of Ks (i.e. 0,0; 1,0; 0,1; 1,1 in the case of two graphics signals and two mask signals) for the whole image in order to find the combination of Ks that best fits the Equation 5. Then, when the best fitting combination of Ks is found, the selector 140 may be used to determine from the best fitting combination of Ks which graphical elements are present.

As a result, the apparatus 100 may output a used graphics signal UG which is the effective combination of graphics signals G1, G2 that is on at the given moment. The apparatus 100 may further output a used mask signal UM which is the effective combination of mask signals that is on at the given moment.

In an embodiment, the order of graphics inputs is fixed so that the order of inputs is the same order as the order in which graphics are applied in the vision mixer (and in Equations 1-5).

Figure 2:
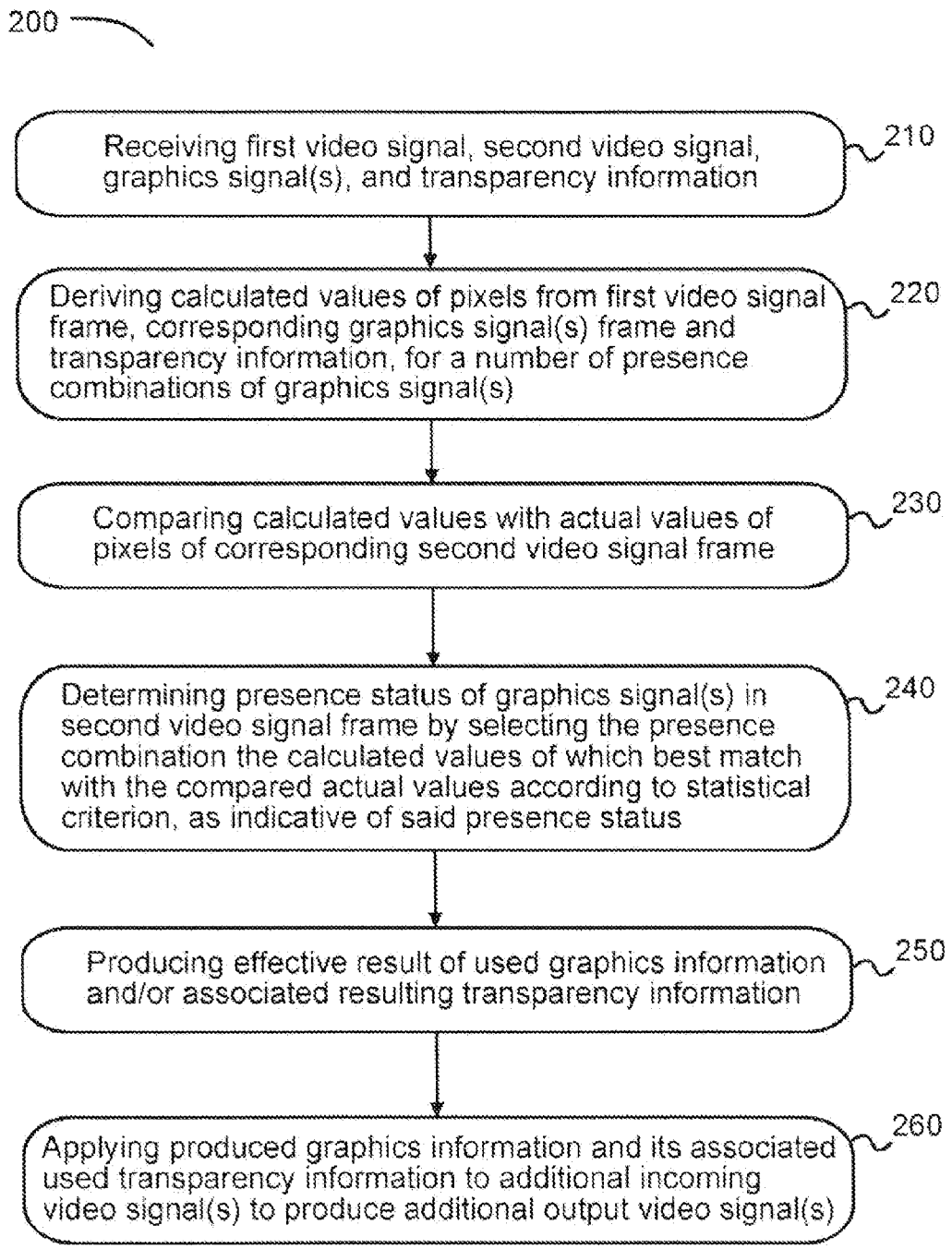
FIG. 2 is a flow diagram illustrating a method according to an embodiment of the invention.

FIG. 2 is a flow diagram illustrating a method 200 of detecting the presence of additional graphics or graphical elements in a video signal according to an embodiment of the invention.

At step 210, the following are received: a first video signal, at least one graphics signal, a second video signal comprising said first video signal mixed at least periodically with the at least one graphics signal, and optionally transparency information that indicates transparency of at least a portion of a frame of an associated graphics signal.

At step 220, calculated values of pixels are derived from a frame of the received first video signal, from a corresponding frame of the received at least one graphics signal, and optionally from the received transparency information. Optionally, the calculated values are derived for a number of presence combinations of the at least one graphics signal.

At step 230, the calculated values are compared with actual values of pixels of a corresponding frame of the received second video signal.

At step 240, a presence status of the at least one graphics signal in the frame of the received second video signal is determined based on the performed comparison. The determination of the presence status may be performed e.g. by selecting—as indicative of the presence status of the at least one graphics signal in the frame of the received second video signal—the presence combination the calculated values of which best match with the compared actual values according to a statistical criterion.

At step 250, used graphics information and/or associated used transparency information are produced, wherein the used graphics information indicates the determined presence status.

At step 260, the produced used graphics information and its associated used transparency information are applied to one or more additional incoming video signals to produce one or more additional output video signals.

As discussed above, the vision mixer 180 can have some of the graphics channels or signals configured as "on", and some of them as "off". In order to determine, which ones were on/off, some or all possible combinations of the on/off-setting of those graphics channels may be dealt through.

When the combinations are dealt through, it is assumed that the order of the graphics channels that are overlaid on top of the active camera signal, is always predetermined and fixed, and it is also assumed that this order is known (for the captured inputs/outputs of the vision mixer 180, it is assumed that it is known which signal would be overlaid first, second, etc.).

For example, if the vision mixer 180 has two graphics channels, the following combinations are inspected:
- 0—nothing is on (Dirty Feed is the same as Clean Feed);
- 1—first graphics signal G1 is on;
- 2—second graphics signal G2 is on;
- 12—both graphics signals G1 and G2 are on, and the second one G2 is drawn on top of the first one G1;
- 21—this combination does not need to be checked, as the order of the graphics channels is always the same 123 . . . , etc.

We emulate the vision mixer's 180 work of overlaying of the graphics signals by using the following equation examples for every pixel of a frame (it is to be noted that these equations are provided as examples only and that the invention is not limited to these equation examples. Instead, other mixing equations may be used):

$$Alpha=(Mask-16)/220$$

$$Result=(1-Alpha)*Background+Alpha*Graphics,$$
assuming $0 \le Alpha \le 1$ where:

Mask: the Y value of graphics mask pixel;

Background: Y, U, V values of the pixel of the original video frame; and

Graphics: Y, U, V values of the pixel of the graphics frame.

Next, we compare the overlay results of all the combinations of the graphics, and choose the one that gives the results that are closest to the Dirty Feed signal. In order to determine how close a resulting signal is to the Dirty Feed, we examine the difference between two frames (DBTF), that is defined as a sum of all differences between corresponding pixels of the two frames.

Differences between the pixel (Y1, U1, V1) and the pixel (Y2, U2, V2) is Euclidean metric, i.e. it is the length of the vector (Y2−Y1, U2−U1, V2−V1), i.e. it is sqrt(sqr(Y2−Y1)+sqr(U2−U1)+sqr(V2−V1)).

For performance reasons we may use a simplified formula: abs(Y2−Y1)+abs(U2−U1)+abs(V2−V1) to determine the length.

So, first DBTF is calculated for the Clean Feed and Dirty Feed frames (Delta0=DF−CF). If Delta0 equals 0, then no graphics signals are on. Otherwise, DBTFs are calculated for each combination of graphics signals. That results in a sequence of Delta0, Delta1, . . . DeltaM, where M=2^N−1, where N is a number of graphics signals. For example, for 3 graphics signals we get this sequence of combinations: 0, 1, 2, 3, 12, 13, 23, 123.

After determining which graphics signals were "on" in the vision mixer 180, the present invention may produce, for every frame captured from the vision mixer 180 inputs/outputs, a used graphics video frame which consists of a mix of all active graphics signals put on top of a black frame. The mixing equations for producing the used graphics feed are the same that are used for emulating the work of the vision mixer 180. Also, for every frame captured from the vision mixer 180 inputs/outputs, the present invention may produce a used mask video frame which represents a combination of all the masks of active graphics signals, and it can be used to overlay the used graphics frame on top of Clean Feed. In order to determine the pixel of the used masks, the present invention may use the following equation:

$$Mask=(DirtyFeed-CleanFeed)/(UsedGraphics-CleanFeed)$$

In case UsedGraphics equals CleanFeed, the pixel in question is ignored.

The equations shown above used to emulate the work of the vision mixer may differ from the actual equations used by an actual vision mixer device. That is why we need to search for a closest match of our results to the Dirty Feed produced by the vision mixer 180 and not the exact match.

Moreover, the inventors have discovered that sometimes a vision mixer may modify some of the regions in the image (e.g. it adds a white line on one of the borders of the image), so the Dirty Feed is not just a product of a graphics overlay process, but also some over interference may happen inside a vision mixer. An advantage of the invention is that the algorithm described above can handle that.

Furthermore, sometimes a vision mixer may use transition effects to overlay the graphics signals. That adds even more interference in the resulting Dirty Feed, in addition to simply overlaying the graphics signals. Yet, the invention allows detecting the graphics that was on/off in Vision Mixer, even in the presence of some of such transition effects (e.g., those ones that alter the pixels of auxiliary graphics mask).

Possible Optimizations:
1. While DeltaX, that is being calculated, is already greater than the current minimal Delta, we can then stop its further calculation, and drop the combination from consideration.
2. Historical data can be used. If some feeds were frequently (or always) turned on (e.g. a game clock), then it is very likely that some of them are turned on for further frames of the video, and this assumption can be taken into consideration for choosing the order of combinations to consider.
3. If the order of the overlay of graphics is not fixed in the vision mixer 180, we can still handle that case by increasing the list of combinations we check, so, for two graphics signals, instead of checking 0,1,2,12, we would check 0,1,2,12,21.
4. We could determine the combination of the graphics signals even if the vision mixer 180 uses complex transition effects that alter the pixels of the graphics signal that is to be overlaid (e.g. when graphics is sliding from the top of the screen to its target place). In such a case, we could iterate through all possible combinations of the transition effects, in addition to all possible combinations of the graphics signals.

Figure 3:
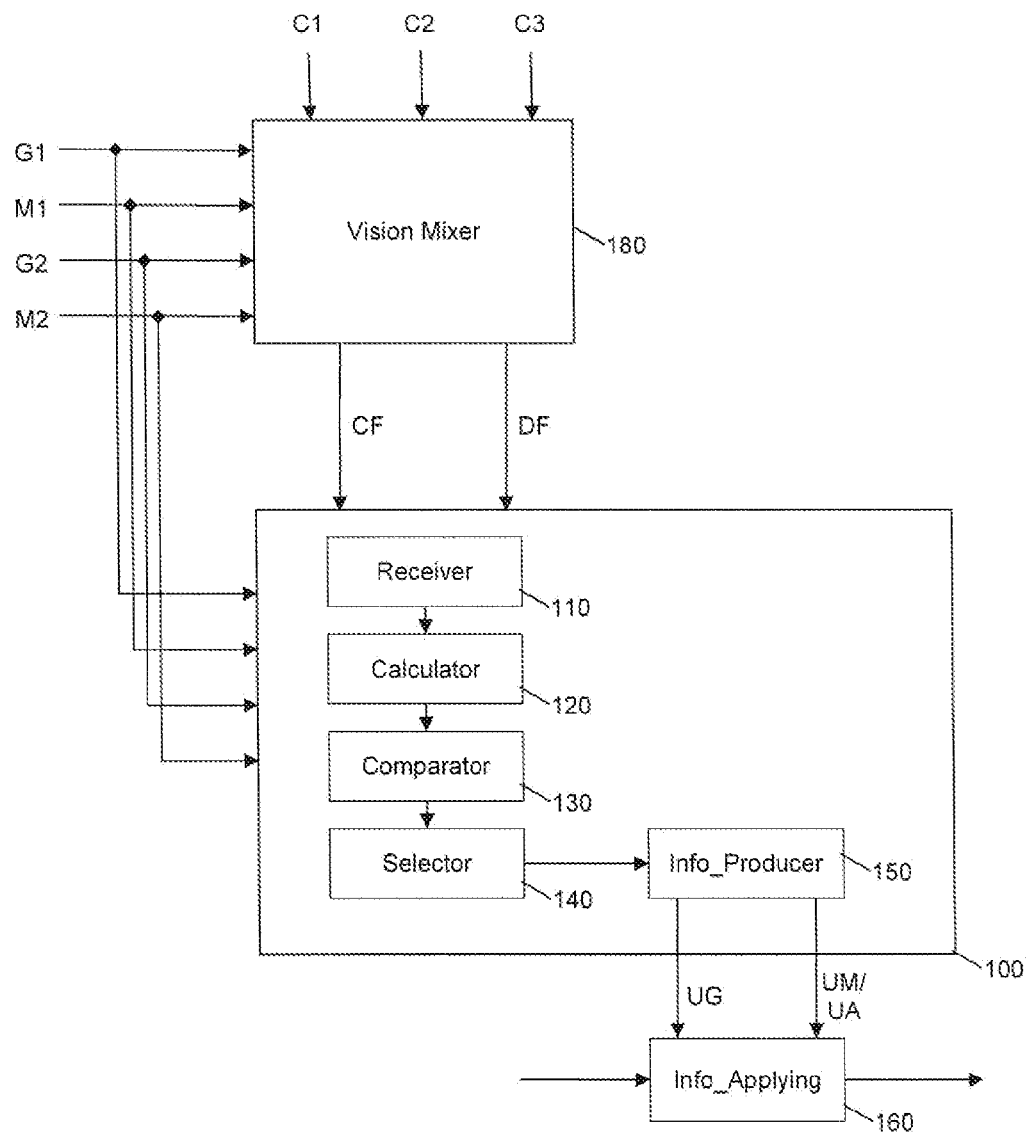
FIG. 3 is a schematic view of a further example apparatus.

FIG. 3 is a schematic view of a further example embodiment of the apparatus 100, which may be used in combination with the vision mixer 180 of FIG. 1 and may contain similar components as already described above.

As discussed above, the vision mixer 180 may apply transition effects to overlay the graphics signals, in addition to simply overlaying the graphics signals. In particular, the vision mixer 180 may fade-in or fade-out the relevant graphics layer. In other words, the graphics layer may be applied with a variable fade factor or presence factor which changes as the graphics layer is transitioned in or out. The above embodiments allow the presence status to be determined for each graphics layer (i.e. whether each particular graphics layer is currently on or off). The above embodiments therefore find the added graphics in terms of finding the multipliers or coefficients ($K_N$) for each graphics layer. Each coefficient $K_N$ can have as its value e.g. either 0 or 1, of which e.g. 0 indicates that the corresponding graphical element is not present, and e.g. 1 indicates that it is present.

Now, it is further desired to also determine the currently applied transition effects for each layer. That is, it is desired to determine or estimate the variable presence factor which has been applied by the vision mixer 180 at this moment to each respective graphics layer.

In some typical examples, the vision mixer 180 may gradually fade-in a particular graphics layer (e.g. a station logo, a game clock or a player's name, a current score or other information). This fade transition typically varies for each frame of the dirty feed signal (second video signal), e.g. as the relevant graphics layer fades in or fades out over a relatively short period of time, typically of the order of one second (e.g. 50 or 60 frames). The relevant graphics layer then appears with a gradual transition with respect to the appearance and transparency which are defined in the respective graphics signal (e.g. G1) and the associated mask signal (e.g. M1). Notably, the mask signal (e.g. M1), providing the optional transparency information, is usually relatively static, being an input to the vision mixer from the graphics system and likewise shared as an input of the same signal into the apparatus 100. The fading transition is applied within the vision mixer 180. The fade level can be considered as an Intensity of the graphics signal. e.g. at a rising level of 0%, 5%, 10%, ..., 90%, 95%, etc. toward the full level.

As a practical example, the fade transition is applied by the vision mixer dynamically and varies over a relatively short time period. The vision mixer thus performs a combination of longer-term visual effects (certain graphics layers which are turned on or off at various times) and short-term effects (e.g. fading transitions). It would be desirable now to be able detect not only the presence status of the graphics signals but also their relative intensity at any one moment, particularly due to the transition effects such as fading. Of course, it is possible that the vision mixer performs other specific forms of graphics processing, transitions or effects while producing the dirty feed, and each of these other forms of transitions or processing may likewise result in a variable presence factor which represents the effects applied by the vision mixer at any particular moment in time.

First, we can consider a simplified system for the purposes of illustration having only one graphics layer G added to the clean feed CF to produce the dirty feed DF.

$$DF=G*M*a+CF*(1-M*a) \quad (Eq.\ 6)$$

In Equation 6, the dirty feed DF is expressed as the clean feed CF with the graphics G added according to the mask signal (or key signal) M, as further modified by the presence status having a variable presence factor 'a'. Here, the variable presence factor 'a' is an enhancement to the on/off presence status $K_N$ above, and suitably represents a variable intensity that may range from fully-off to fully-on or any level therebetween.

The mask signal M defines an intended transparency of the graphics layer G. Considering one frame of the video signal (e.g. 1920×1080 pixels), in most areas the graphics layer is not present and thus the mask may define the graphics layer as being completely transparent. The mask signal M thus conveniently shows that the content of the graphics signal G can be ignored in those irrelevant areas, and conversely defines the one or more regions where the graphics content G is visible. In these relevant areas, the mask signal M suitably provides transparency information defining the intended transparency of the graphics content. However, the vision mixer 180 may modify the actual transparency of the graphics content, e.g. by applying a fade transition. Thus, for each frame, the graphics content of the graphics signal G has actually been applied with a dynamic presence factor or intensity factor coefficient represented by the term 'a'. Like the other signals considered herein, the variable presence factor 'a' may take a value for each pixel in each image frame.

We can now rearrange Equation 6, which provides Equation 7:

$$DF=G*M*a+CF-CF*M*a \quad (Eq.\ 7)$$

Equation 8 is then derived from Equation 7. In Equation 8, the difference between the clean and dirty feeds (DF−CF) is now rearranged on the one side of the equation. The other side of the equation gathers the Graphics, Mask and CF inputs modified by the unknown presence factor 'a':

$$(G-CF)*M*a=DF-CF \quad (Eq.\ 8)$$

We can now define signals 'X' and 'Y' based on the two sides of Equation 8, leaving the unknown presence factor 'a' expressed by X and Y as in Equation 9. Here, the Y term can be considered as a content difference signal obtained by subtracting the clean feed CF from the dirty feed DF. The X term can be considered as a graphics difference signal obtained by subtracting the clean feed CF from the graphics signal G and here multiplying the subtracted result by the mask signal M:

$$X=(G-CF)*M$$

$$Y=DF-CF$$

$$X*a=Y \quad (Eq.\ 9)$$

Now we can find the variable presence factor 'a' by a suitable analysis. The example embodiments use the technique of regression through origin as in Equation 10:

$$a=\text{sum}(Xi*Yi)/\text{sum}(Xi^2),\ \text{for all}\ i \quad (Eq.\ 10)$$

Equation 10 finds the value of the variable 'a' (e.g. a percentage or a decimal value in the range from 0 to 1) by using the statistical approach of linear regression. This statistical analysis algorithm has been used in many other industrial fields to estimate an unknown parameter, and can likewise be applied in the context of the present invention to positive effects.

In other words, the inventors have developed an apparatus now which is able to estimate the previously unknown dynamic presence factor 'a' applied by the vision mixer, based on the received input signals CF, DF, G, M. The apparatus 100 of FIG. 3 may configure the selector 140 to produce the variable presence factor.

This estimated presence factor 'a' may be held as an additional signal within the apparatus 100 or output from the apparatus 100. Conveniently, this additional signal can be termed a UA signal or 'Used Additional Effects' signal. The UA signal represents the estimated presence factor 'a' as currently applied to the switched-on graphics layer G in the received dirty feed signal DF. The UA signal may be a monochrome video signal with each pixel value representing the estimated presence factor of that particular pixel as applied by the vision mixer 180 to the one or more added graphics signals. This UA signal thus represents the additional graphics processing performed within the vision mixer 180, with respect to the associated original mask signal M. Notably, the UA signal is determined by the apparatus 100 but without requiring any further connections or modifications to the existing hardware of the vision mixer 180.

In one example, the apparatus 100 may output the UA signal to be used by other downstream components of the system. Particularly, the system may include the information applying unit 160 as discussed above for FIG. 1 which positioned at any suitable point downstream. Thus, a transmission network may carry the relevant signals between the information producing unit 150 and the information applying unit 160.

In one example, the information applying unit 160 may be arranged to receive at least the UM and UG signals. The information applying unit 160 may apply the used graphics signal UG according to the used mask UM signal to one or more additional incoming video signals to produce one or more additional output video signals. The information applying unit 160 may further use the UA signal to modify the additional output video signals. Thus, specific content in the video signals, such as a billboard, is automatically replaced to present a modified alternate output video signal.

In one example, the UA signal may be applied to the Used Mask (UM) signal by the apparatus 100 and more particularly by the information producer 150. For example, the UM signal may be multiplied by the UA signal. Thus, the apparatus 100 may effectively create a modified used mask signal UM which provides the effective result of the vision effects (e.g. the transitional fade effect) applied within the vision mixer 180 to the applied graphics layer. In this example, the modified used mask signal UM/UA and the used graphics signal UG are then carried to the information applying unit 160 and applied in the process of modifying the image content of the video signals.

With the described system, the transitional fade effect may thus be accurately recreated in the produced alternate video signals. For example, a billboard in the original dirty feed DF may be replaced with an alternate billboard image, and the graphics layer G that overlies the replaced billboard is still accurately represented, including maintaining the relevant visual transition effects such as fading. Thus, the viewer sees a more pleasing and realistic replacement image and the replacement process is less noticeable for the viewer.

This approach may now be extended to two, three or more graphics layers. Each of the graphics layers is known in terms of the content and optionally the transparency information of the layer (i.e. the respective G and M signals). The presence factor 'a' for each layer is unknown. However it is now possible to determine the respective presence factor a1 for the first layer, the presence factor a2 for the second layer, the presence factor a3 for the third layer, and so on, or at least to derive a useful estimate of that presence factor.

The example embodiments may be enhanced by assuming that the first graphics layer G1 is always applied first (if present) and that the second graphics layer G2 (again, if present) will be applied visually superior over the first layer, and so on. In which case, for two layers then Equation 11 may be derived in the same way as Equation 8 above:

$$DF-CF=a1*M1*(G1-CF)+a2*M2*(G2-CF)+a1*a2*M1*M2*(CF-G1) \quad (Eq. 11)$$

Solving this equation may be achieved by calculating least squares for a1, a2 and a1*a2. Then by defining:

$$A=DF-CF$$

$$B=\{M1'(G1-CF), M2*(G2-CF), M2*M1*(CF-G1)\}, \quad (Eq. 12)$$

One example solution now incrementally computes AtA=At*A, and AtB=At*B. Then solves W in AtA*W=AtB, where W={a1, a2, a1*a2}. Finally the nonlinear problem can be solved where W={a1,a2,a1*2}, using a1 & a2 from the linear solution and constrain that a1 & a2 are in the range 0 ... 1. In one example this method may be applied using the Damped Least Squares Algorithm, also known as the Levenberg-Marquardt Algorithm. One example may use the Penalty Method with soft constraints.

Likewise, extending this method to three layers provides Equation 13 below which can be solved by a corresponding process:

$$DF-CF=(G1-CF)M*a1+(G2-CF)*M2*a2+(G3-CF)\\*M3*a3+(CF-G1)*M2*M1*a2*a1(CF-G1)\\*M3*M1*a3*a1+(CF-G2)*M3*M2*a3*a2+\\(G1-CF)M3*M2*M1*a3*a2*a1 \quad (Eq. 13)$$

Surprisingly, these methods prove to be effective within the context of the claimed invention and can be extended to three, four or even more graphics layers as appropriate, thus finding the estimated fade factor a1, a2, a3, a4, etc. respectively for each layer. These estimated fade factors may each be held and applied separately, or may all be represented within the UA signal, as discussed above.

Figure 4:
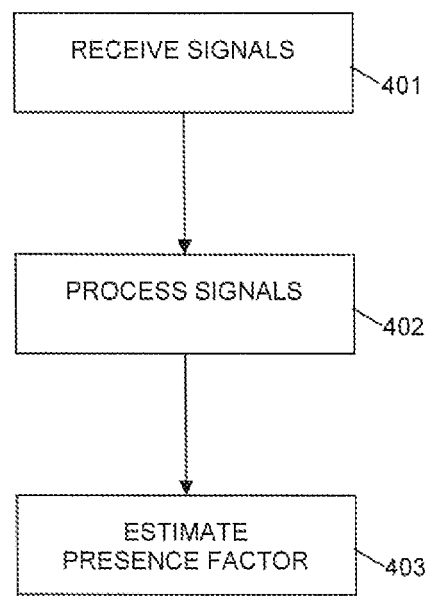
FIG. 4 is a flow diagram of a further example method.

FIG. 4 is a flowchart which summarises the methods of the example embodiments described herein. Step 401 comprises receiving a first video signal and a second video signal, which in the example embodiments are the clean feed CF and the dirty feed DF, respectively. At least one graphics signal G and associated at least one mask signal M are received. The second video signal DF comprises said first video signal CF mixed at least periodically with the at least one graphics signal G according to the at least one mask signal M and further according to a variable presence factor. This variable presence factor represents, for example, a transitional effect such as fading applied by an upstream component such as the vision mixer 180.

Step 402 comprises processing the received signals. The processing may include comparing pixel values in a frame of the first video signal with pixel values in a corresponding frame of the second video signal to obtain a content difference signal representing differences between the first and second video signals.

Step 403 comprises estimating the variable presence factor in the frame of the second video signal to provide an estimated variable presence factor, using the content difference signal, the first video signal, the at least one graphics signal and the at least one mask signal. The estimating may further include performing a statistical analysis to obtain an estimate of the variable presence factor using content difference signal, the first video signal, the at least one graphics signal and the at least one mask signal. More particularly, the estimating may include performing a linear regression using content difference signal, the first video signal, the at least one graphics signal and the at least one mask signal.

In one example, the processing of step 402 may include processing the graphics signal and the first video signal by comparing pixel values in a frame of the graphics signal with pixel values in a corresponding frame of the first video signal to obtain a graphics difference signal representing differences between the at least one graphics signal and the first video signal. The estimating of step 403 may then include generating the estimated variable presence factor signal using the content difference signal and the graphics difference signal.

The exemplary embodiments can include, for example, any suitable servers, workstations, PCs, laptop computers, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD1RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of detecting the presence of additional graphics in a video signal, the method comprising:
   receiving a first video signal, at least one graphics signal, and a second video signal comprising said first video signal mixed at least periodically with the at least one graphics signal;
   deriving calculated values of pixels from a frame of the received first video signal and a corresponding frame of the received at least one graphics signal;
   comparing the calculated values with actual values of pixels of a corresponding frame of the received second video signal; and
   determining a presence status of the at least one graphics signal in the frame of the received second video signal based on the performed comparison,
   wherein said receiving a first video signal, at least one graphics signal, and a second video signal comprising said first video signal mixed at least periodically with the at least one graphics signal further comprises receiving a mask signal providing transparency information indicating transparency of at least a portion of a frame of an associated graphics signal; and
   wherein said deriving calculated values of pixels from a frame of the received first video signal and a corresponding frame of the received at least one graphics signal further comprises deriving the calculated values from the received transparency information in the mask signal in addition to the frame of the received first video signal and the corresponding frame of the received at least one graphics signal.

2. The method of claim 1, further comprising:
deriving the calculated values for each of a number of presence combinations of the at least one graphics signal, and
selecting the presence combination the calculated values of which best match with the compared actual values according to a statistical criterion, as indicative of said presence status of the at least one graphics signal in the frame of the received second video signal.

3. The method of claim 1, further comprising:
producing an effective result of at least one of used graphics information and associated resulting transparency information, based on said determined presence status.

4. The method of claim 3, further comprising:
applying the produced used graphics information and its associated used transparency information to one or more additional incoming video signals to produce one or more additional output video signals.

5. The method of claim 1, wherein said determining a presence status of the at least one graphics signal in the frame of the received second video signal based on the performed comparison further comprises:
determining the presence status including a variable presence factor by which the second video signal is mixed currently with the first video signal.

6. The method of claim 5, wherein said determining the presence status including a variable presence factor by which the second video signal is mixed currently with the first video signal further comprises:
comparing pixel values in a frame of the first video signal with pixel values in a corresponding frame of the second video signal to obtain a content difference signal representing differences between the first video signal and the second video signal; and
estimating the variable presence factor in the frame of the second video signal, using the content difference signal, the first video signal, the at least one graphics signal and the at least one mask signal.

7. The method of claim 6, wherein said estimating the variable presence factor in the frame of the second video signal comprises:
performing a statistical analysis to estimate the variable presence factor using the content difference signal, the first video signal, the at least one graphics signal and the at least one mask signal.

8. The method of claim 6, wherein said estimating the variable presence factor in the frame of the second video signal comprises:
performing a linear regression using the content difference signal, the first video signal, the at least one graphics signal and the at least one mask signal.

9. The method of claim 6, wherein said estimating the variable presence factor in the frame of the second video signal comprises:
processing the graphics signal and the first video signal by comparing pixel values in a frame of the graphics signal with pixel values in a corresponding frame of the first video signal to obtain a graphics difference signal representing differences between the at least one graphics signal and the first video signal; and
applying the content difference signal and the graphics difference signal to estimate the variable presence factor.

10. The method of claim 5, wherein the variable presence factor is caused by a transition effect which has been applied currently in the received second video signal.

11. The method of claim 5, wherein the variable presence factor is caused by a transitional fading effect which has been applied in a current frame of the received second video signal.

12. An apparatus for detecting the presence of additional graphics in a video signal, the apparatus comprising:
a receiver configured to receive a first video signal, at least one graphics signal, and a second video signal comprising said first video signal mixed at least periodically with the at least one graphics signal;
a calculator configured to derive calculated values of pixels from a frame of the received first video signal and a corresponding frame of the received at least one graphics signal;
a comparator configured to compare the calculated values with actual values of pixels of a corresponding frame of the received second video signal; and
a selector configured to determine a presence status of the at least one graphics signal in the frame of the received second video signal based on the performed comparison;
wherein the receiver is further configured to receive a mask signal providing transparency information indicating transparency of at least a portion of a frame of an associated graphics signal, and
wherein the calculator is further configured to derive the calculated values from the received transparency information in the mask signal in addition to the frame of the received first video signal and the corresponding frame of the received at least one graphics signal.

13. The apparatus of claim 12, wherein the calculator is further configured to derive the calculated values for a number of presence combinations of the at least one graphics signal; and
wherein the selector is configured to perform the determination of said presence status by selecting the presence combination the calculated values of which best match with the compared actual values according to a statistical criterion, as indicative of said presence status of the at least one graphics signal in the frame of the received second video signal.

14. The apparatus of claim 12, wherein the comparator is further configured to compare pixel values in a frame of the first video signal with pixel values in a corresponding frame of the second video signal to obtain a content difference signal representing differences between the first and second video signals, and
wherein the selector is further configured to determine the presence status having a variable presence factor of the at least one graphics signal in the frame of the second video signal, using the content difference signal, the first video signal, the at least one graphics signal and the mask signal.

15. The apparatus of claim 14, wherein the selector is further configured to perform a statistical analysis to obtain the variable presence factor using the content difference signal, the first video signal, the at least one graphics signal and the mask signal.

16. The apparatus of claim 14, wherein the selector is further configured to process the at least one graphics signal and the first video signal by comparing pixel values in a frame of the graphics signal with pixel values in a corresponding frame of the first video signal to obtain a graphics difference signal representing differences between the graphics signal and the first video signal, and to generate the variable presence factor using the content difference signal and the graphics difference signal.

17. The apparatus of claim 14, wherein the receiver is further configured to receive the at least one graphics signal representing a plurality of graphics layers each of which is mixed periodically with the second video signal, and the selector is configured to generate the variable presence factor for each of the plurality of graphics layers, respectively.

18. The apparatus of claim 12, further comprising an information producer configured to produce an effective result of at least one used graphics information and associated resulting transparency information, based on said determined presence status.

19. The apparatus of claim 18, further comprising an information applying unit configured to apply the produced used graphics information and its associated transparency information to one or more additional incoming video signals to produce one or more additional output video signals.

20. A computer program product stored in a non-transitory computer readable storage medium for detecting additional graphics in a video signal, the computer program product comprising software instructions which, when run, causes a data-processing system to perform the following:

receiving a first video signal, at least one graphics signal, and a second video signal comprising said first video signal mixed at least periodically with the at least one graphics signal;

deriving calculated values of pixels from a frame of the received first video signal and a corresponding frame of the received at least one graphics signal;

comparing the calculated values with actual values of pixels of a corresponding frame of the received second video signal; and determining a presence status of the at least one graphics signal in the frame of the received second video signal based on the performed comparison, wherein said receiving a first video signal, at least one graphics signal, and a second video signal comprising said first video signal mixed at least periodically with the at least one graphics signal further comprises receiving a mask signal providing transparency information indicating transparency of at least a portion of a frame of an associated graphics signal; and wherein said deriving calculated values of pixels from a frame of the received first video signal and a corresponding frame of the received at least one graphics signal further comprises deriving the calculated values from the received transparency information in the mask signal in addition to the frame of the received first video signal and the corresponding frame of the received at least one graphics signal.

\* \* \* \* \*